US008300997B2

(12) United States Patent
Chao et al.

(10) Patent No.: US 8,300,997 B2
(45) Date of Patent: Oct. 30, 2012

(54) WAVELENGTH INTERLEAVER

(75) Inventors: Shiuh Chao, Hsinchu (TW);
Chih-T'sung Shih, Hsinchu (TW)

(73) Assignee: National Tsing Hua University,
Hsinchu (TW)

( * ) Notice: Subject to any disclaimer, the term of this patent is extended or adjusted under 35 U.S.C. 154(b) by 325 days.

(21) Appl. No.: 12/683,318

(22) Filed: Jan. 6, 2010

(65) Prior Publication Data

US 2011/0081108 A1    Apr. 7, 2011

(30) Foreign Application Priority Data

Oct. 2, 2009  (TW) .............................. 98133561 A

(51) Int. Cl.
*G02B 6/26* (2006.01)
*G02B 6/42* (2006.01)
(52) U.S. Cl. .................. 385/32; 385/1; 385/15; 385/31; 385/39; 385/50
(58) Field of Classification Search .................... 385/32, 385/50
See application file for complete search history.

(56) References Cited

U.S. PATENT DOCUMENTS

| | | | | |
|---|---|---|---|---|
| 5,926,496 A * | 7/1999 | Ho et al. | ........................ | 372/92 |
| 6,643,421 B1 * | 11/2003 | Chin et al. | ...................... | 385/15 |
| 7,065,276 B2 * | 6/2006 | Scheuer et al. | ................. | 385/50 |
| 7,801,446 B2 * | 9/2010 | Little et al. | ....................... | 398/85 |
| 8,019,185 B2 * | 9/2011 | Yap | .................................... | 385/3 |
| 8,095,010 B2 * | 1/2012 | Socci et al. | ...................... | 398/85 |
| 2006/0159392 A1 * | 7/2006 | Popovic | .......................... | 385/27 |
| 2007/0230856 A1 * | 10/2007 | Yamazaki | ......................... | 385/5 |

OTHER PUBLICATIONS

Chih T'sung Shih et al., "Spectral shift by half free-spectral-range for microring resonator employing the phase jump phenomenon in coupled-waveguide and application on all-microring wavelength interleaver", Optics, Express, May 11, 2009, vol. 17, No. 10, pp. 7756-7770.

* cited by examiner

*Primary Examiner* — Ryan Lepisto
(74) *Attorney, Agent, or Firm* — WPAT, P.C.; Anthony King

(57) ABSTRACT

The present invention provides a wavelength interleaver comprising a first interleaving unit, a second interleaving unit and an adapting waveguide coupled between the first interleaving unit and the second interleaving unit; both the first interleaving unit and the second interleaving unit including an input waveguide, an output waveguide and a filter coupled between the input waveguide and the output waveguide. The present invention sets up the gap between the input waveguide and the filter, and the filter and the output waveguide for extending components usage specification of the signal transmission system. Therefore, there is no need to add unnecessary components in design, the size is smaller and the cost of the signal transmission system is reduced.

8 Claims, 15 Drawing Sheets

WAVELENGTH INTERLEAVER

BACKGROUND OF THE INVENTION

1. Field of the Invention

The present invention relates to a wavelength interleaver, and more particularly, to a wavelength interleaver with small size and reducing the cost of the signal transmission system.

2. Description of the Related Art

As technologies change with each passing day, population increasing and internet users increasing, the internet provider provides more bandwidths for transmitting the increasing audio and video signals according to the increasing requirement of communication transmission. Technologies of wavelength division multiplexing (WDM) and dense wavelength division multiplexing (DWDM) are capable of expanding the total transmission capacity of the existing optical fiber framework. Dense wavelength division multiplexing (DWDM) could transmit optical wavelengths with various signals through a single optical fiber. Optical filtering membranes are used for multiplexing/de-multiplexing and adding/dropping the optical wavelengths. However, the channel spacing of the optical filtering membranes is hardly to reduce and the optical filtering membranes may be aged along with time in a high power condition. Thus, decreasing spacings between adjacent channels of the transmission system is a better way for increasing the total transmission capacity.

FIG. 1 is a block diagram of a traditional 1×2 wavelength interleaver. The 1×2 wavelength interleaver 10 separates optical input signals 20 into odd optical signals 201 and even optical signals 202. The spacing are changed from f to 2f. For the system framework of existing optical filtering membranes speaking, frequency spacings between adjacent channels are 200 GHz. If the frequency spacings between adjacent channels are lowered to 100 GHz, the dense signals are, then, converted to wide signals. Assuming the network framework of the optical filtering membranes is invariable, the channel is, therefore, doubled for doubling the total transmission capacity. Moreover, the wavelength interleaver 10 could be a 1×4 wavelength interleaver, a 4×8 wavelength interleaver, a 1×8 wavelength interleaver or a M×N wavelength interleaver (both M and N are integers). Different types of the wavelength interleavers have different applications. Users can choose a suitable type wavelength interleaver for use according to the requirement.

Generally speaking, micro-optics and planar lightwave circuit (PLC) are the two ways for interleaving wavelengths. A disadvantage of the former one is the great size and the size may be greater after multi-stage optimization. The disadvantage of planar lightwave circuit (PLC) is the small size and the size is still small after multi-stage optimization. Furthermore, the cost of crystal used in micro-optics is higher than the cost of the planar lightwave circuit (PLC) manufacturing through semiconductor manufacture processes.

FIG. 2(a) is a hint diagram of a traditional 1×2 wavelength interleaver accomplished by planar lightwave circuit (PLC). The 1×2 wavelength interleaver is a Mach-Zehnder wavelength interleaver. FIG. 2(b) is a transmission rate waveform diagram of the Mach-Zehnder wavelength interleaver. As shown in FIG. 2(b), the Mach-Zehnder wavelength interleaver is not practical due to the problems of great crosstalk between the first output and the second output and dispersion.

FIG. 3 is a hint diagram with an adding ring filter in the wavelength interleaver shown in FIG. 2(a). That is, the ring filter provides a non-linear phase modulation with less attenuation or without attenuation. The two 3 dB couplers attenuate the input signals and provide a linear phase shifting to the input signals. There is a sufficient band to separate the channels (optical wave channels) of each input signal by the combination of the two 3 dB couplers for attenuating input signals and the ring filter for non-linear phase modulation. Therefore, problems of crosstalk and dispersion are solved. However, the band is narrowed for decreasing the channel bandwidth after transmitting input signals several times. Accordingly, the whole transmission system should be developed with higher precision for avoiding errors causing by the narrowed bandwidth of optical input signals with a single wavelength. Thus, the cost and size of the whole transmission system is great increasing.

It is desirable, therefore, to provide a wavelength interleaver with small size and reducing the cost of the transmission system.

SUMMARY OF THE INVENTION

The above-mentioned problems are addressed by the present invention. The method of the present invention will be understood according to the disclosure of the following specification and drawings.

An embodiment of the present invention is to provide a wavelength interleaver comprising a first interleaving unit, a second interleaving unit and an adapting waveguide coupled between the first interleaving unit and the second interleaving unit; both the first interleaving unit and the second interleaving unit including an input waveguide, an output waveguide and a filter coupled between the input waveguide and the output waveguide, the input waveguide of the first interleaving unit receiving an optical input signal with a particular wavelength for coupling to the filter of the first interleaving unit and outputting a first interleaving signal from the output waveguide of the first interleaving unit; the input waveguide of the second interleaving unit receiving the optical input signal through the adapting waveguide for coupling to the filter of the second interleaving unit and outputting a second interleaving signal from the output waveguide of the second interleaving unit. The gap width between the input waveguide and the filter of the first interleaving unit is a first gap width and the gap width between the filter and the output waveguide of the first interleaving unit is a second gap width, wherein one of the first gap width and the second gap width is greater than a jumping threshold gap, and the other one of the first gap width and the second gap width is less than the jumping threshold gap width. The gap width between the input waveguide and the filter of the second interleaving unit is a third gap width and the gap width between the filter and the output waveguide of the second interleaving unit is a forth gap width, wherein both the third and forth gap widths are greater or less than the jumping threshold gap width.

Another embodiment of the present invention is to provide a wavelength interleaver which comprises a first interleaving unit and a second interleaving unit. The first interleaving unit comprises a first input waveguide, a first output waveguide and a first filter and a second filter disposed between the first input waveguide and the first output waveguide. The second interleaving unit comprises a second input waveguide, a second output waveguide and a third filter and a fourth filter disposed between the second input waveguide and the second output waveguide. The first input waveguide receives an optical input signal with a particular wavelength for coupling to the first filter and the second filter and outputs a first interleaving signal from the first output waveguide. The second input waveguide receives the optical input signal for coupling to the third filter and the fourth filter and outputs a second interleaving signal from the second output waveguide. The gap width between the first input waveguide and the first filter is a first gap width, the gap width between the first filter and the second filter is a second gap width, and the gap width between the second filter and the first output waveguide is the first gap width, wherein one of the first gap width and the second gap width is greater than a jumping threshold gap width, and the other one of the first gap width and the second gap width is less than the jumping threshold gap width. The gap width between the second input waveguide and the third filter is a third gap width, and the gap width between the third filter and the fourth filter the is a fourth gap width, the gap width between the fourth filter and the second output waveguide is the third gap width, wherein both the third and the fourth gap widths are greater or less than a jumping threshold gap.

BRIEF DESCRIPTION OF THE DRAWINGS

The invention will be described according to the appended drawings in which.

DETAILED DESCRIPTION OF THE INVENTION

Figure 1:
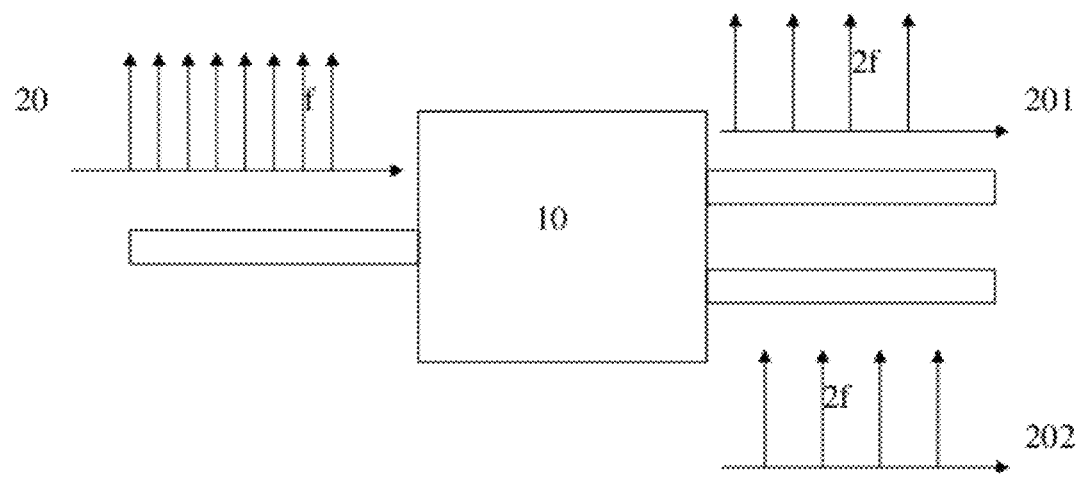
FIG. 1 shows a block diagram of a traditional 1×2 wavelength interleaver.
Figure 2A:
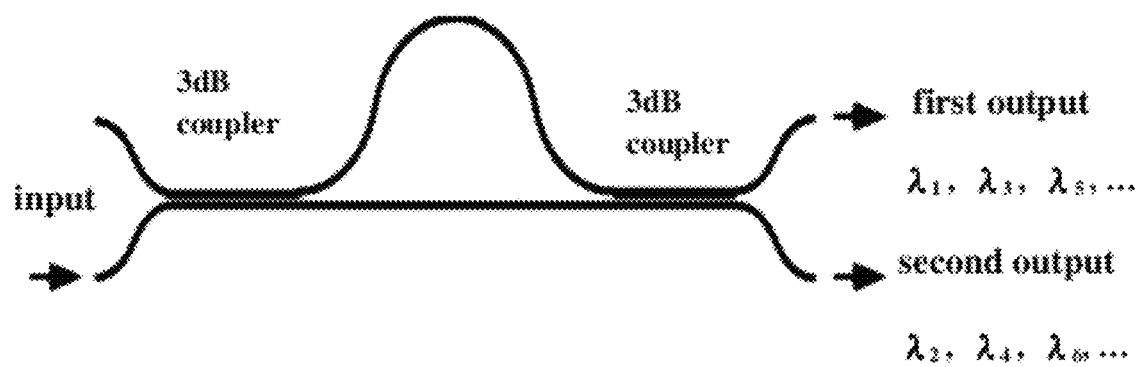
FIG. 2(a) shows hint diagram of a traditional 1×2 wavelength interleaver accomplished by planar lightwave circuit (PLC)
Figure 2B:
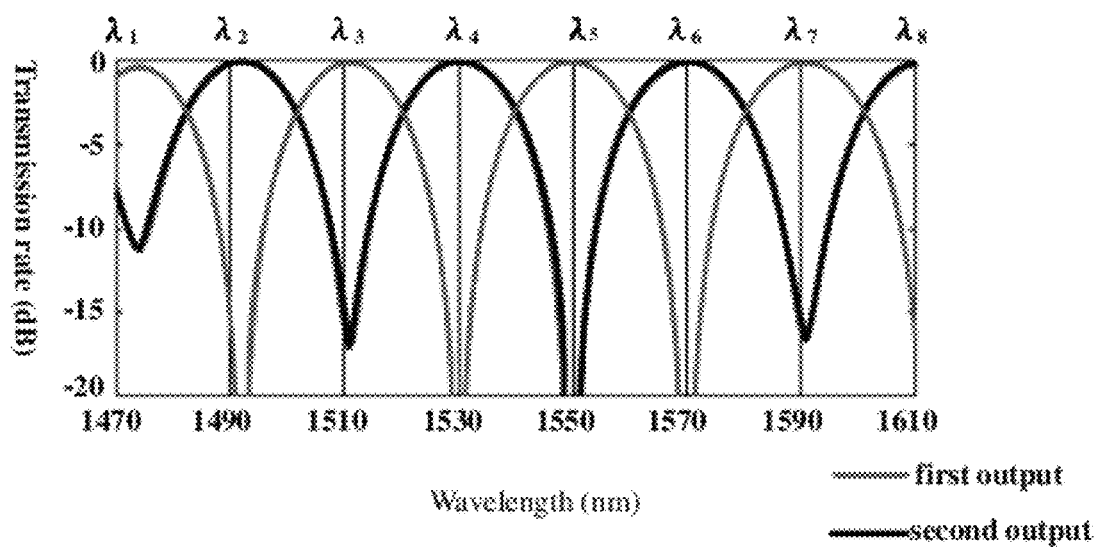
FIG. 2(b) shows a transmission rate waveform diagram of the 1×2 wavelength interleaver shown in FIG. 2(a)
Figure 3:
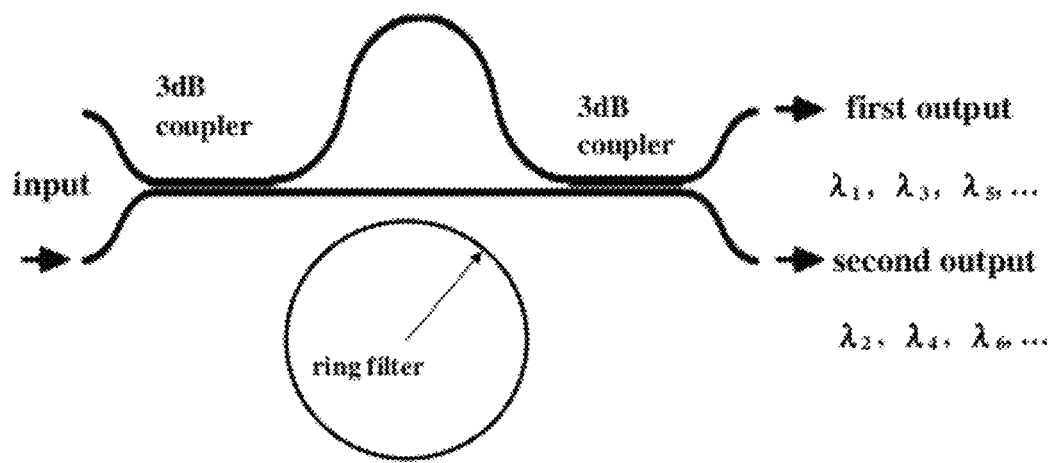
FIG. 3 shows a hint diagram with an adding ring filter in the wavelength interleaver shown in FIG. 2(a)
Figure 4:
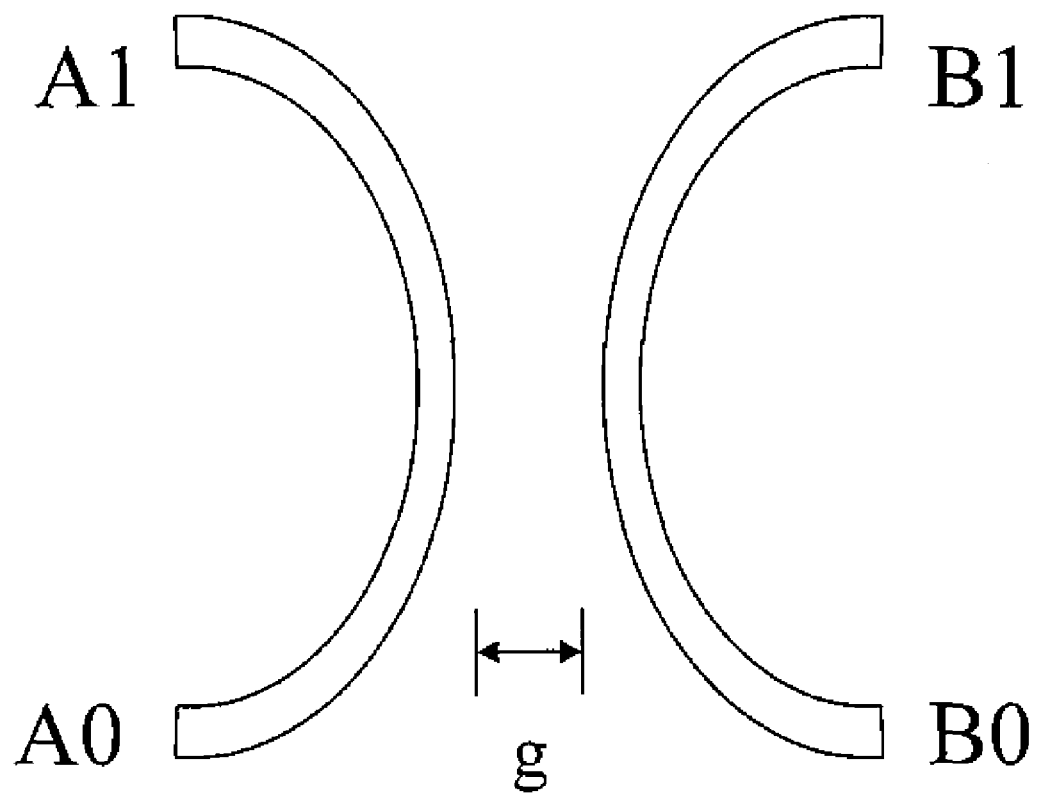
FIG. 4 shows a hint diagram of two half-ring couplers.

The present invention sets up the gap width between the input waveguide and the filter, and the filter and the output waveguide for extending components usage specification of the signal transmission system. Therefore, there is no need to add unnecessary components in design, the size is smaller and the cost of the signal transmission system is reduced. FIG. 4 is a hint diagram of two half-ring couplers. The two half-ring $$\begin{bmatrix} A1 \\ B1 \end{bmatrix} = S \begin{bmatrix} A0 \\ B0 \end{bmatrix} = \begin{bmatrix} S11 & S12 \\ S21 & S22 \end{bmatrix} \begin{bmatrix} A0 \\ B0 \end{bmatrix} \quad (1)$$

couplers have two input end A0, B0 and two output end A1, B1. The output signal from the output end A1 is not only provided by the input signal from input end A0, but also by the input signal coupling from the input end B0. Accordingly, the output signal from the output end B1 is not only provided by the input signal from input end B0, but also by the input signal coupling from the input end A0. Therefore, two converting matrixes can be defined.

In equation (1), S11 represents the signal conversion rate from input end A0 to output end A1; S12 represents the signal conversion rate from $$\begin{bmatrix} A1 \\ B1 \end{bmatrix} = \begin{bmatrix} |S11|e^{-j\varphi_{11}} & |S12|e^{-j\varphi_{12}} \\ |S21|e^{-j\varphi_{21}} & |S22|e^{-j\varphi_{22}} \end{bmatrix} \begin{bmatrix} A0 \\ B0 \end{bmatrix} \quad (2)$$

input end A0 to output end B1; S21 represents the signal conversion rate from input end B0 to output end B1; and S22 represents the signal conversion rate from input end B0 to output end B1. $\phi_{11}$ represents the signal phase shifting angle from input end A0 to output end A1; $\phi_{12}$ represents the signal phase shifting angle from input end A0 to output end B1; $\phi_{21}$ represents the signal phase shifting angle from input end B0 to output end A1; and $\phi_{22}$ represents the signal phase shifting angle from input end B0 to output end A1.

Figure 5:
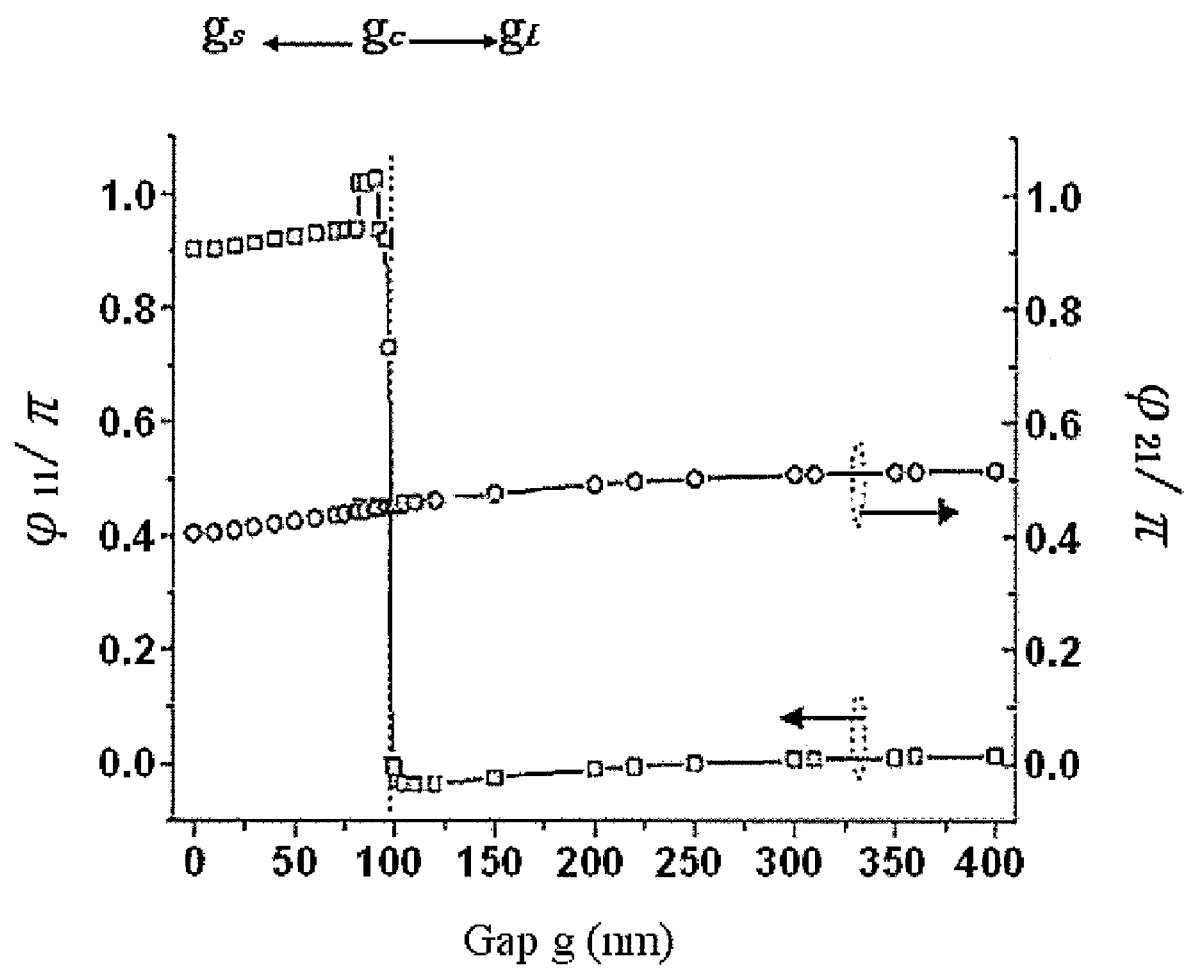
FIG. 5 shows a hint diagram of the gap width (g) and the phase shifting angles of FIG. 4.

FIG. 5 is a hint diagram of the gap width (g) and the phase shifting angles of FIG. 4. We can find out that $\phi_{21}$ generates a phase jumping of $\pi$ at the gap width (g) less than 100 nm when the input signal has a constant wavelength (1550 nm) and the gap width (g) is varying by the way of finite difference time domain (FDTD). Assuming the jumping gap width is $g_S$ the non-jumping gap width is $g_L$, and the jumping threshold gap width is g, (around 100 nm), $\phi_{21}$ generates a phase jumping of $\pi$ at the gap width (g) less than 100 nm ($g_C$). $\phi_{11}$ also generates a phase jumping, but the jumping level is lower.

Actually, the phase jumping generated by $\phi_{21}$ is less than $\pi$ (about 0.9$\pi$) due to the coupled-induced frequency shift (CIFS) effect. Coupled-induced frequency shift (CIFS) effect will be no longer described because it is not a key point of the present invention. Moreover, the jumping threshold gap width ($g_C$) is not fixed in 100 nm. Waveguide width, waveguide refraction rate and wrap layer refraction rate may affect the jumping threshold gap width ($g_C$).

Figure 6:
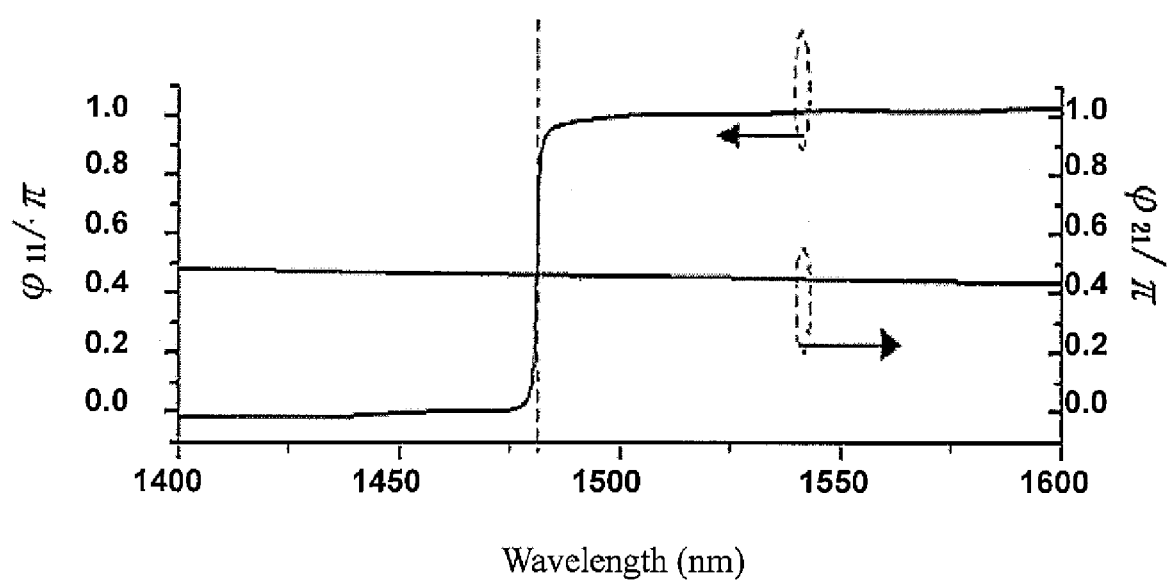
FIG. 6 shows a hint diagram of the input signal wavelengths and the phase shifting angles of FIG. 4.

FIG. 6 is a hint diagram of the input signal wavelengths and the phase shifting angles of FIG. 4. We can find out that $\phi_{21}$ generates a phase jumping of $\pi$ at the wavelength about 1480 nm when the wavelength of the input signal varies and the gap width (g) is fixed at 85 nm by the way of finite difference time domain (FDTD). $\phi_{11}$ also generates a phase jumping, but the jumping level is lower. Certainly, the phase jumping generated by $\phi_{21}$ is also not $\pi$ due to the coupled-induced frequency shift (CIFS) effect. Therefore, both the gap width (g) and the wavelength effect should be concerned whatever the phase jumping appearance is adopted or not.

Figure 7:
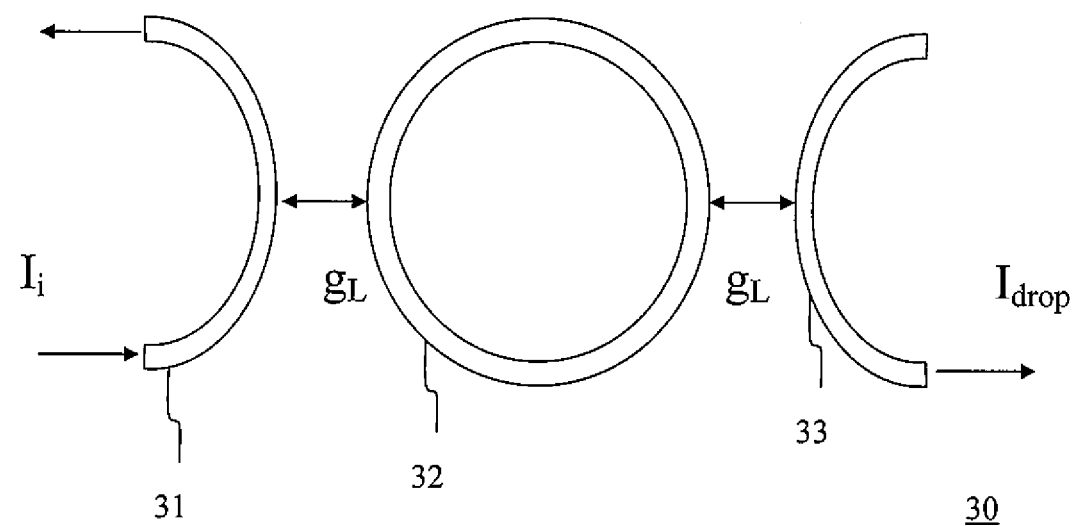
FIG. 7 shows a hint diagram of a non-jumping-dual-arm ring resonator.
Figure 8:
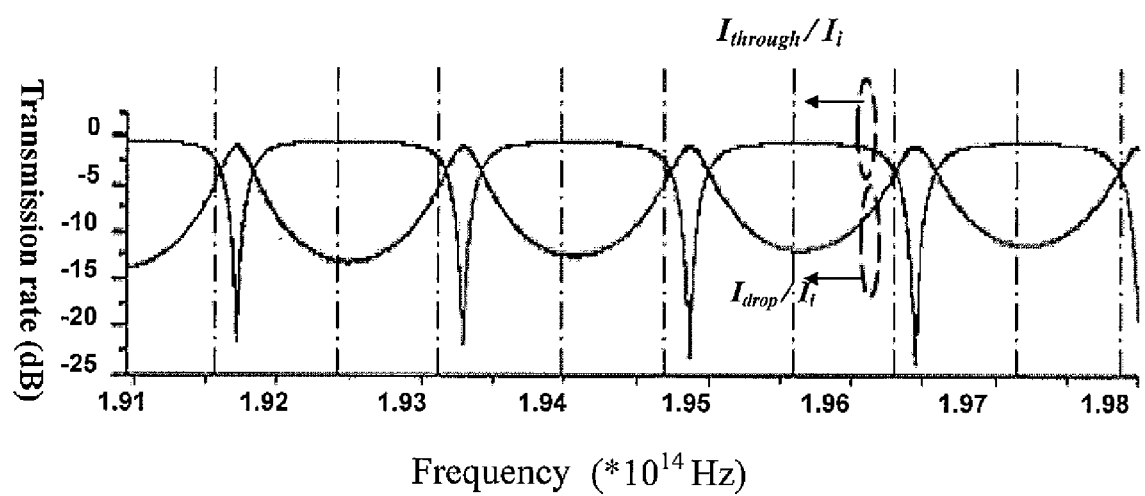
FIG. 8 shows an output waveform diagram of FIG. 7.

FIG. 7 is a hint diagram of a non-jumping-dual-arm ring resonator. The dual-arm ring resonator 30 comprises an input waveguide 31, a ring filter 32 and an output waveguide 33. Due to the gap width between the input waveguide 31 and the ring filter 32 being $g_L$ (greater than the jumping threshold gap width, for example, 350 nm) and the gap width between the output waveguide 33 and the ring filter 32 being also $g_L$, the phase jumping appearance (phase difference of it) won't be happened on the input signal $I_i$ when the input signal $I_i$ is coupled. The Output waveforms of output signals $I_{through}$, $I_{drop}$ are shown in FIG. 8.

Figure 9:
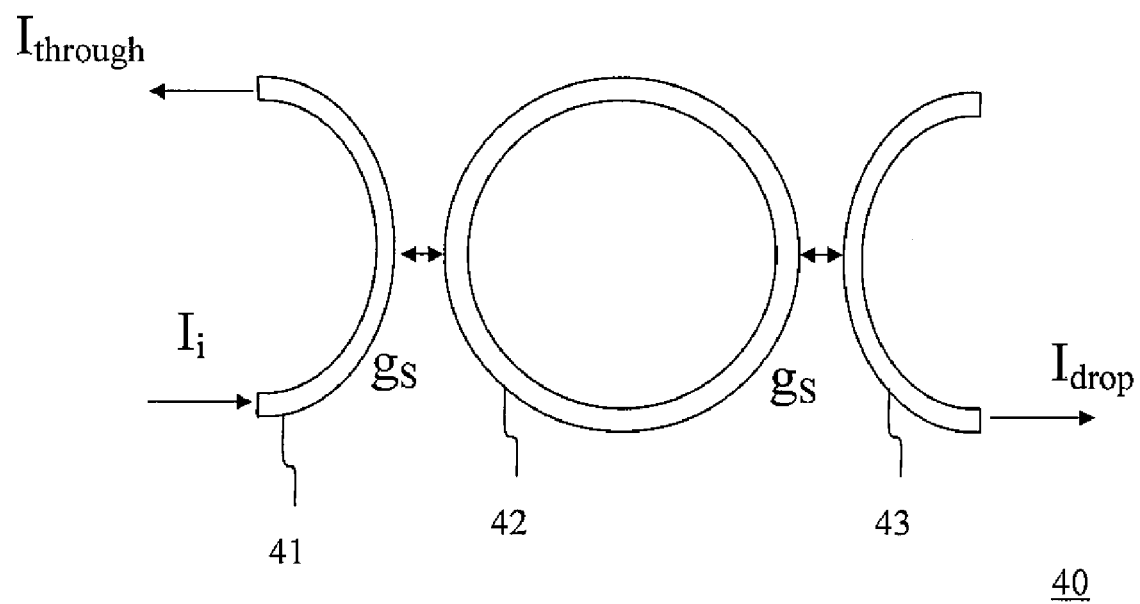
FIG. 9 shows a hint diagram of a jumping-dual-arm ring resonator.
Figure 10:
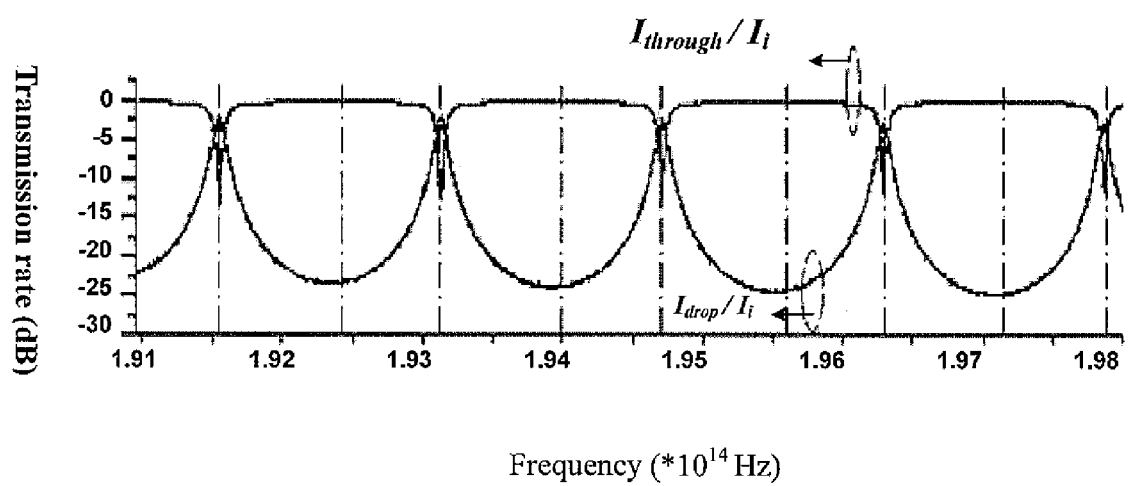
FIG. 10 shows an output waveform diagram of FIG. 9.

FIG. 9 is a hint diagram of a jumping-dual-arm ring resonator. The dual-arm ring resonator 40 comprises an input waveguide 41, a ring filter 42 and an output waveguide 43. Due to the gap width between the input waveguide 41 and the ring filter 42 being $g_S$ (less than the jumping threshold gap width, for example, 20 nm) and the gap width between the output waveguide 43 and the ring filter 42 being also $g_S$, the phase jumping appearance (phase difference of π) will be happened on the input signal $I_i$ when the input signal $I_i$ is coupled. The Output waveforms of output signals $I_{through}$, $I_{drop}$ are shown in FIG. 10.

It is known that the wavelength channels of the dual-arm ring resonators in FIG. 7 and FIG. 9 are interleaved through finite difference time domain (FDTD) analysis. There is a π/2 phase shifting when the jumped input signal is coupled from the input waveguide to the ring filter and a π/2 phase shifting when a signal passes around in the ring filter and couples to the input waveguide. If the input signal is a non-jumping signal, the phase shifting is no longer existed. Thus, each phase difference between the wavelength channels of the dual-arm ring resonators in FIG. 7 and FIG. 9 is π and therefore, interleaved. The reason of the inconsistent channel wavelengths of the transmission spectrum is the coupled-induced frequency shift (CIFS) effect due to the jumping of the dual-arm ring resonators in FIG. 9. Accordingly, the spectrum diagram in FIG. 10 is right-shifting a certain distance than the spectrum diagram in FIG. 8. The certain distance is generated due to coupled-induced frequency shift (CIFS) effect. Therefore, the wave trough of the output signal $I_{through}$ is greater negative than the FIG. 8's and the wave trough of the output signal $I_{drop}$ is less negative than the FIG. 8's.

Figure 11:
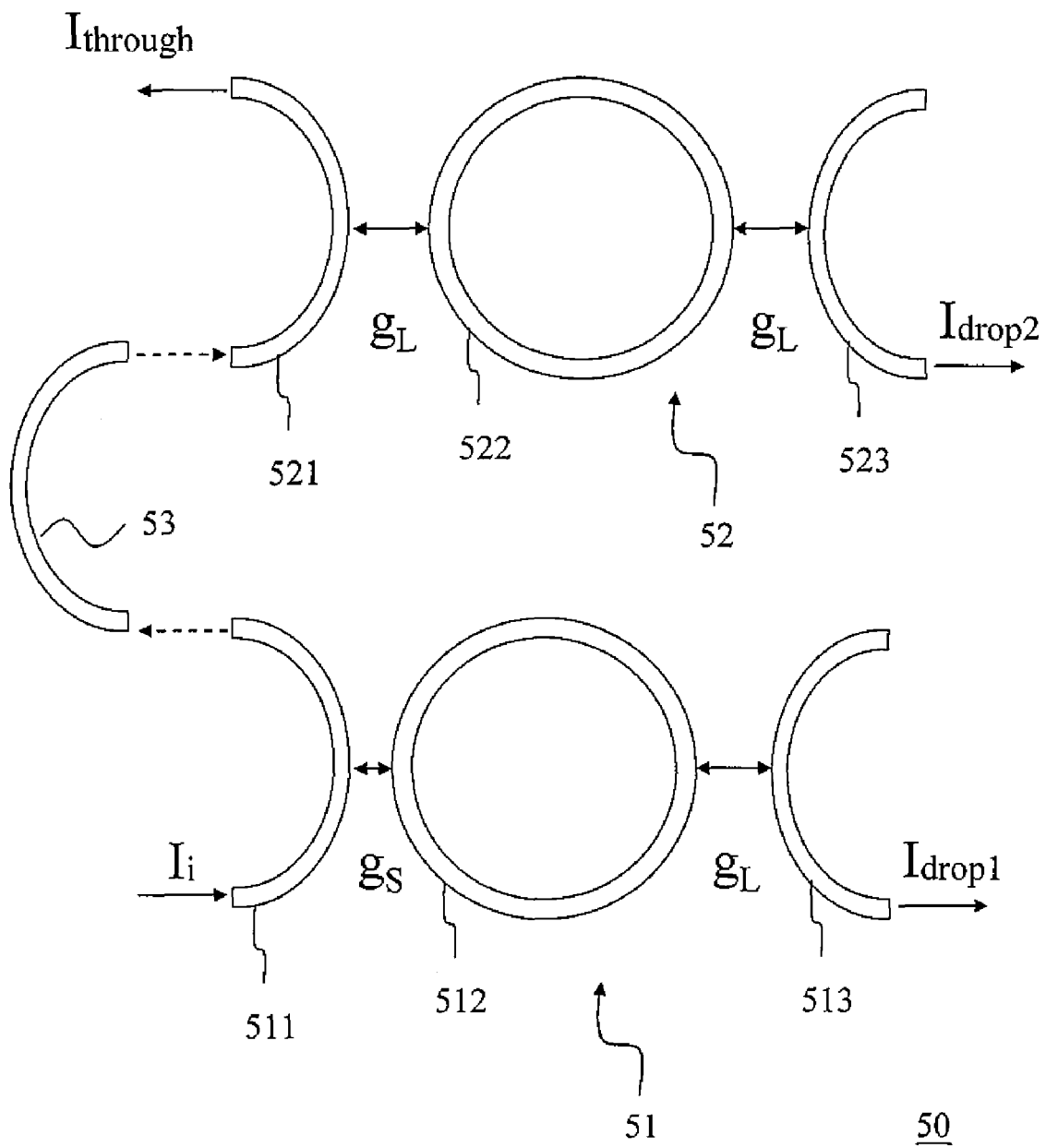
FIG. 11 shows an embodiment of the wavelength interleaver of the present invention.

FIG. 11 is an embodiment of the wavelength interleaver of the present invention. The wavelength interleaver 50 is consisted of dual-arm ring resoanators in FIG. 7 and FIG. 9 for generating interleaved output waveforms. The wavelength interleaver 50 comprises a first interleaving unit 51 and a second interleaving unit 52. Each of the first interleaving unit 51 and second interleaving unit 52 includes an input waveguide 511, 521, an output waveguide 513, 523 and a filter 512, 522 coupled between the input waveguide 511, 521 and the output waveguide 513, 523. The input waveguide 511 of the first interleaving unit 51 receives an optical input signal Ii with a particular wavelength (whole wavelengths) for coupling to its filter 512 and outputs a first interleaving signal $I_{drop1}$ (odd/even wave signal) from its output waveguide 513. The input waveguide 521 of the second interleaving unit 52 couples to the optical input signal Ii with the particular wavelength for coupling to its filter 522 and outputs a second interleaving signal $I_{drop2}$ (even/odd wave signal) from its output waveguide 523. Moreover, there is an adapting waveguide 53 coupled between the first interleaving unit 51 and second interleaving unit 52 for transmitting the optical input signal Ii from the input waveguide 511 to the input waveguide 521. The first interleaving signal $I_{drop1}$ and the second interleaving signal $I_{drop2}$ are the interleaving output signals.

The gap width between the input waveguide 511 and the filter 512 of the first interleaving unit 51 is a first gap width, $g_S$, and the gap width between the filter 512 and the output waveguide 513 of the first interleaving unit 51 is a second gap width, $g_L$. The second gap width, $g_L$, is greater than the first gap width, $g_S$. The gap width between the input waveguide 521 and the filter 522 of the second interleaving unit 52 is the second gap width, $g_L$, and the gap width between the filter 522 and the output waveguide 523 of the second interleaving unit 52 is also the second gap width, $g_L$.

According to the jumping appearance shown in FIG. 5, the first gap width, $g_S$, is less than the jumping threshold gap width, $g_C$, for the optical input signal Ii with jumping appearance when the optical input signal Ii is coupled. The second gap width, $g_L$, is greater than the jumping threshold gap width, $g_C$, for the optical input signal Ii without jumping appearance when the optical input signal Ii is coupled. Therefore, the output signals are interleaved.

Furthermore, the first gap width, $g_S$, and the second gap width, $g_L$, of the first interleaving unit 51 are swappable. Accordingly, the same first interleaving signal is outputted when the first gap width is $g_L$ and the second gap width is $g_S$. For the second interleaving unit 52 speaking, the gap width between the input waveguide 521 and the filter 522 can be the first gap width, $g_S$, and the gap width between the filter 522 and the output waveguide 523 of the second interleaving unit 52 can be the first gap width, $g_S$. Accordingly, the same second interleaving signal is outputted.

Moreover, the filters 512, 522 are ring-type or racetrack-type resonating filters or waveguides. The shapes of the input waveguides 511, 521 and output waveguides 513, 523 are half-ring-type or half-racetrack-type waveguides, and the shape of the adapting waveguide 53 is a half-ring-type or a half-racetrack-type waveguide. The racetrack-type refers to an ellipse track of horse racing.

Figure 12:
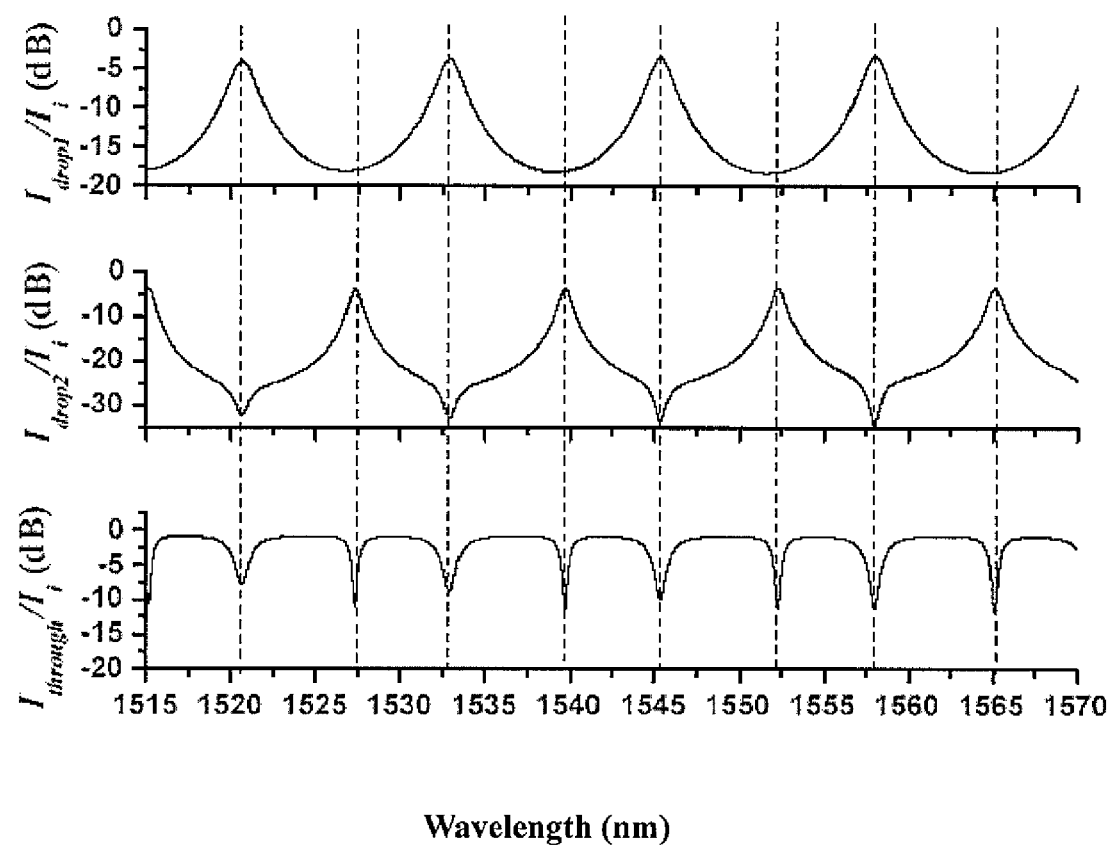
FIG. 12 shows a relative diagram of the optical input signal wavelength and the transmission rate of the output signal in FIG. 11.

FIG. 12 is a relative diagram of the optical input signal wavelength and the transmission rate of the output signal in FIG. 11. The waveforms are simulated on the conditions of gap width, $g_L$, being 350 nm and $g_S$ being 20 nm. As shown, wave trough of the output signal $I_{drop2}/I_i$ is a great negative number and is much difference to wave-peak of the output signal $I_{drop1}/I_i$. The difference is also greater than the traditional wavelength interleaver for avoiding the interference or affection toward the output signal $I_{drop1}/I_i$. Therefore, the performance of the signal transmission system can be good enough without precision components or adding other components. The cost and size of the whole transmission system is reduced due to wider specifications of other components used in the transmission system.

Moreover, the first gap width, $g_S$, and second gap width, $g_L$, are swappable. Accordingly, the second gap width, $g_L$, is less than the jumping threshold gap width, $g_C$, for the optical input signal $I_i$ with jumping appearance when the optical input signal $I_i$ is coupled. The first gap width, $g_S$, is greater than the jumping threshold gap width, $g_C$, for the optical input signal $I_i$ without jumping appearance when the optical input signal $I_i$ is coupled. Therefore, the output signals are interleaved.

The wavelength interleaver 50 shown in FIG. 11 is a 1×2 wavelength interleaver. We can couple another wavelength interleaver 50 to receive the output signals $I_{drop2}$ and $I_{drop1}$ and then the four output signals will be generated for practicing the design of a 1×4 wavelength interleaver. With the same principle, we can take the 1×2 wavelength interleaver 50 of the present invention as a basic unit for practicing 4×8 wavelength interleavers, 1×8 wavelength interleavers or other types wavelength interleavers that we desired by arranging several basic units.

Figure 13:
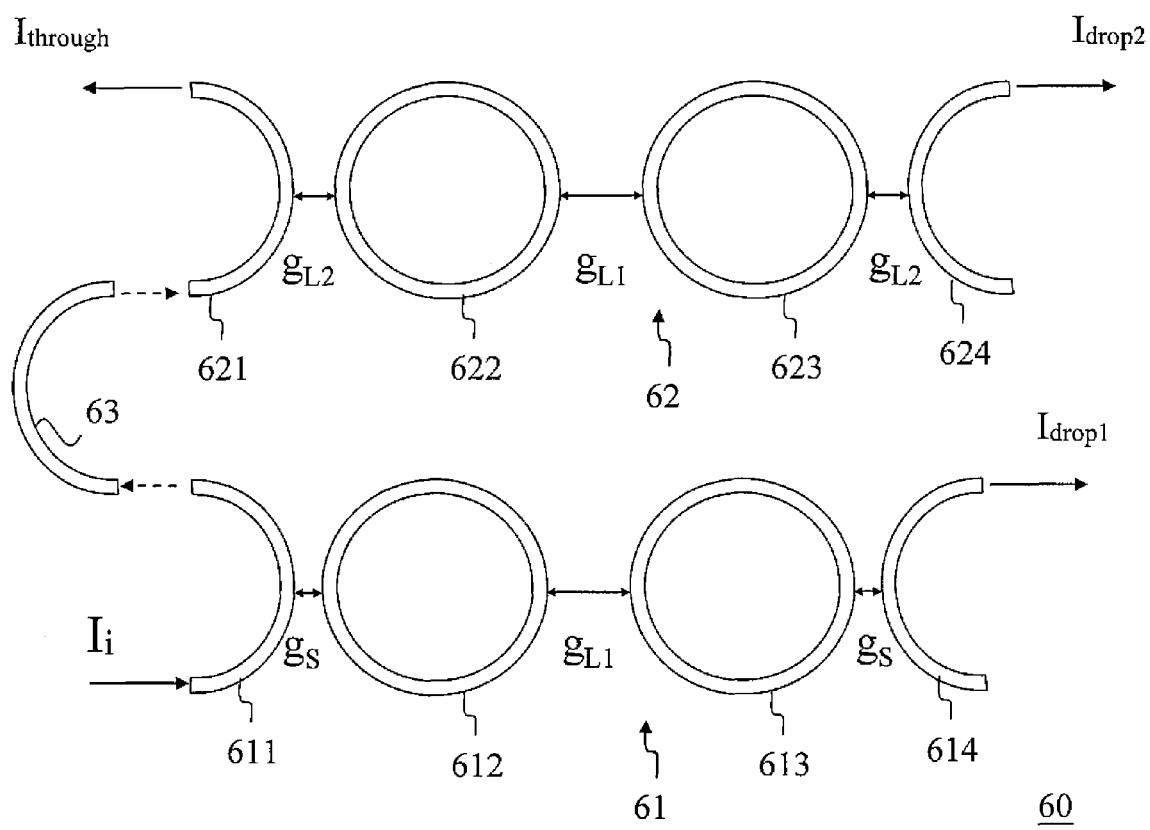
FIG. 13 shows another embodiment of the wavelength interleaver of the present invention.

FIG. 13 is another embodiment of the wavelength interleaver of the present invention. The wavelength interleaver 60 disposes two extra filter (the same to the filter 512,522) between the filter 512, 522 and the output waveguide 513, 523 of the wavelength interleaver shown in FIG. 11 for making the output signal $I_{drop2}/I_i$, being a great negative number and much more difference to wave-peak of the output signal $I_{drop1}/I_i$. The wavelength interleaver 60 comprises a first interleaving unit 51 and a second interleaving unit 62. The first interleaving unit 61 comprises a first input waveguide 611, a first output waveguide 614 and a first filter 612 and a second filter 613 disposed between the first input waveguide 611 and the first output waveguide 614. The second interleaving unit 62 comprises a second input waveguide 621, a second output waveguide 624 and a third filter 622 and a fourth filter 623 disposed between the second input waveguide 621 and the second output waveguide 62. The first input waveguide 611 receives an optical input signal $I_i$ with a particular wavelength for coupling to first filter 612 and the second filter 613 and outputs a first interleaving signal (odd/even wave signal) $I_{drop1}$ from the first output waveguide 614. The second input waveguide 621 receives the optical input signal. $I_i$ for coupling to the third filter 622 and the fourth filter 623 and outputs a second interleaving signal (even/odd wave signal) $I_{drop2}$ from the second output waveguide 624. The output signals of the first interleaving signal (odd/even wave signal) $I_{drop1}$ and the second interleaving to signal (even/odd wave signal) $I_{drop2}$ are, therefore, interleaved.

The gap width between the first input waveguide 611 and the first filter 612 of the first interleaving unit 61 is a first gap width, $g_S$, the gap width between the first filter 612 and the second filter 613 is a second gap width, $g_{L1}$, and the gap width between the second filter 613 and the first is output waveguide 614 is the first gap width, $g_S$. The second gap width, $g_{L1}$ is greater than the first gap width, $g_S$. The gap width between the second input waveguide 621 and the third filter 622 of the second interleaving unit 62 is a third gap width, $g_{L2}$, the gap width between the third filter 622 and the fourth filter 623 is the second gap width, $g_{L1}$, and the gap width between the fourth filter 623 and the second output waveguide 624 is the third gap width, $g_{L2}$. The second gap width, $g_{L1}$, is greater than the first gap width, $g_S$. Moreover, the gap width between the first filter 612 and the second filter 613 and the gap width between the third filter 622 and the fourth filter 623 can be different gap widths.

According to the jumping appearance shown in FIG. 5, the first gap width, $g_S$, is less than the jumping threshold gap width, $g_C$, for the optical input signal $I_i$ with jumping appearance when the optical input signal $I_i$ is coupled. The second gap width, $g_{L1}$, and the third gap width, $g_{L2}$, are greater than the jumping threshold gap width, $g_C$, for the optical input signal $I_i$ without jumping appearance when the optical input signal $I_i$ is coupled. Therefore, the output signals are interleaved.

Furthermore, according to the jumping appearance shown in FIG. 5, the second gap width, $g_{L1}$, can be less than the jumping threshold gap width, $g_C$, for the optical input signal $I_i$ with jumping appearance when the optical input signal $I_i$ is coupled. Meanwhile, the first gap width, $g_S$, and the third gap width, $g_{L2}$, are greater than the jumping threshold gap width, $g_C$. Now, the gap width between the second input waveguide 621 and the third filter 622 of the second interleaving unit 62 is the third gap width, $g_{L2}$, the gap width between the third filter 622 and the fourth filter 623 is the first gap width, $g_S$, and the gap width between the fourth filter 623 and the second output waveguide 624 is the third gap width, $g_{L2}$. The third gap width, $g_{L2}$, is not limited to be greater than the first gap width, $g_S$, or less than the first gap width, $g_S$. Thus, the jumping appearance won't be occurred when the optical input signal $I_i$ coupled when the optical input signal $I_i$ is coupled. Therefore, the output signals of the present invention are interleaved.

The first gap width, $g_S$, and second gap width, $g_{L1}$, in the first interleaving unit 61 are swappable. Accordingly, the first gap width will be $g_S$ and the second gap width will be $g_L$ and the same first interleaving signal will be outputted. The gap widths in the second interleaving unit 62 between the adjacent components can be greater or less than the jumping threshold gap width, $g_C$. The same second interleaving signal will be also outputted.

Besides, if there are N (N is an integer greater than 0) extra filters disposed between the first filter 612 and the second filter 613 of the first interleaving unit 61 for improving the performance of the wavelength interleaver 60, the arrangement of the gap widths between the adjacent components should be the first gap width, $g_S$ (less than the jumping threshold gap $g_C$), the second gap width, $g_{L1}$ (greater than the jumping threshold gap $g_C$), the first gap width, $g_S$ (less than the jumping threshold gap $g_C$), . . . , and the first gap width, $g_S$ (less than the jumping threshold gap width, $g_C$,), in sequence. Accordingly, the gap widths are arranged continuously of alternate less than the jumping threshold gap width, $g_C$, and greater than the jumping threshold gap width, $g_C$. Or, the arrangement of the gap widths between the adjacent components should be the second gap width, $g_{L1}$ (greater than the jumping threshold gap width, $g_C$), the first gap width, $g_S$ (less than the jumping threshold gap width, $g_C$), the second gap width, $g_{L1}$ (greater than the jumping threshold gap width, $g_C$), . . . , and the second gap width, $g_{L1}$ (greater than the jumping threshold gap width, $g_C$), in sequence. Accordingly, the gap widths are arranged continuously of alternate greater than the jumping threshold gap width, $g_C$, and less than the jumping threshold gap width, $g_C$. If there are N (N is an integer greater than 0) extra filters disposed between the third filter 622 and the fourth filter 623 of the first interleaving unit 62 for improving the performance of the wavelength interleaver 60, each gap width between the adjacent components should be the first gap width, $g_S$ (less than the jumping threshold gap width, $g_C$,), or the second gap width, $g_{L1}$ (greater than the jumping threshold gapwidth, $g_C$,).

Figure 14:
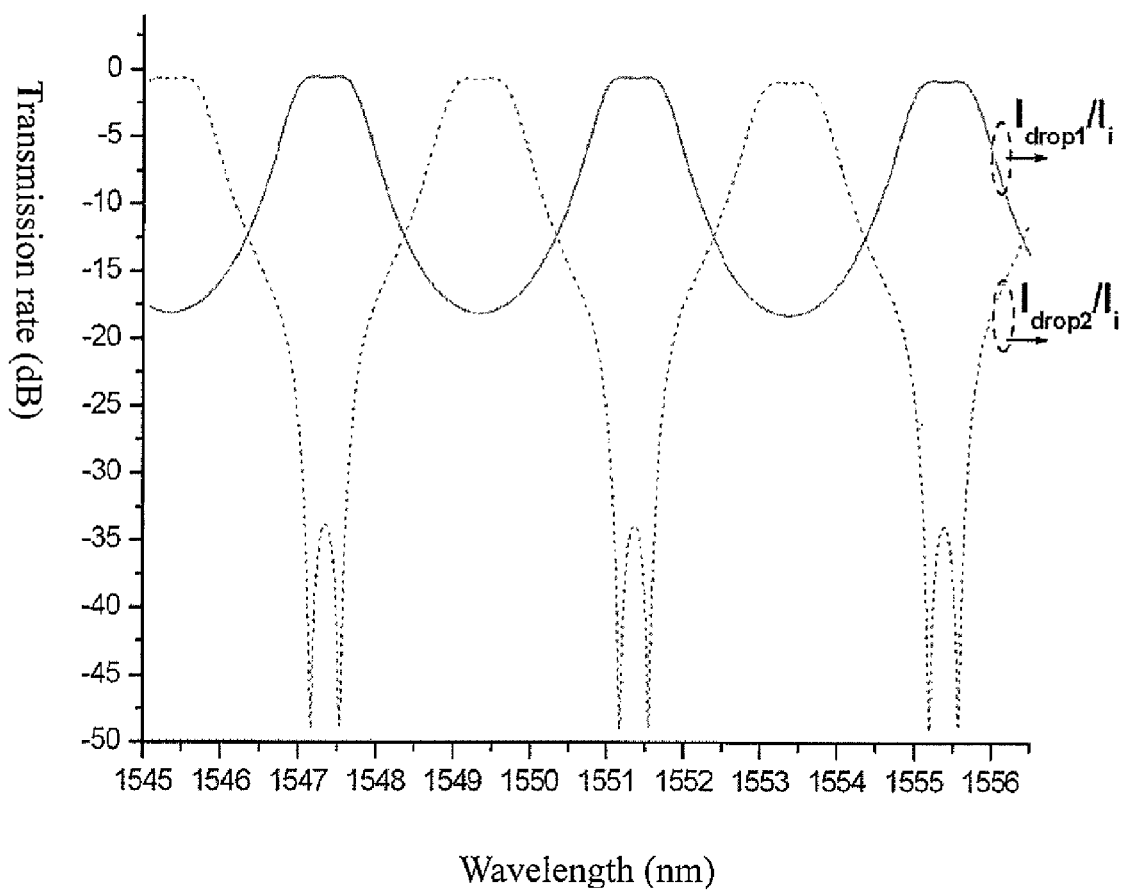
FIG. 14 shows a relative diagram of the optical input signal wavelength and the transmission rate of the output signal in FIG. 13.

FIG. 14 shows a relative diagram of the optical input signal wavelength and the transmission rate of the output signal in FIG. 13. The waveforms are simulated on the conditions of the gap width, $g_{L1}$, being 350 nm, the gap width, $g_{L2}$, being 250 nm and $g_S$ being 20 nm. As shown, wave trough with a particular wavelength of the output signal $I_{drop2}/I_i$ is a great negative number and is much difference to wave-peak with a particular wavelength of the output signal $I_{drop1}/I_i$. The difference is also greater than the traditional wavelength interleaver for avoiding the interference or affection toward the output signal $I_{drop1}/I_i$. Moreover, due to both wave trough of the output signal $I_{drop2}/I_i$ and wave peak of the output signal $I_{drop2}/I_i$ possessing particular wavelengths, the transmission affection of the varied wavelengths following the temperature variation is compensated. Therefore, the performance of the signal transmission system can be good enough without precision components or adding other components. The cost and size of the whole transmission system is reduced due to wider specifications of other components used in the transmission system.

The above-described embodiments of the present invention are intended to be illustrative only. Numerous alternative embodiments may be devised by those skilled in the art without departing from the scope of the following claims.

What is claimed is:

1. A wavelength interleaver comprising a first interleaving unit, a second interleaving unit and an adapting waveguide coupled between the first interleaving unit and the second interleaving unit; both the first interleaving unit and the second interleaving unit including an input waveguide, an output waveguide and a filter coupled between the input waveguide and the output waveguide, the input waveguide of the first interleaving unit receiving an optical input signal with a particular wavelength for coupling to the filter of the first interleaving unit and outputting a first interleaving signal from the output waveguide of the first interleaving unit; the input waveguide of the second interleaving unit receiving the optical input signal through the adapting waveguide for coupling to the filter of the second interleaving unit and outputting a second interleaving signal from the output waveguide of the second interleaving unit, wherein the gap between the input waveguide and the filter of the first interleaving unit is a first gap and the gap between the filter and the output waveguide of the first interleaving unit is a second gap; wherein one of the first gap and the second gap is greater than a jumping threshold gap, and the other one is less than the jumping threshold gap.

2. The wavelength interleaver of claim 1, wherein the filters of the first interleaving unit and the second interleaving unit are ring-type or racetrack-type waveguides.

3. The wavelength interleaver of claim 1, wherein the gap between the input waveguide and the filter of the second interleaving unit is a third gap and the gap between the filter and the output waveguide of the second interleaving unit is a fourth gap; wherein both the third gap and the fourth gap are greater than a jumping threshold gap or less than the jumping threshold gap.

4. The wavelength interleaver of claim 1, wherein the shapes of the input waveguide and the output waveguide of the first interleaving unit are half-ring-type or half-racetrack-type waveguides.

5. The wavelength interleaver of claim 1, wherein the shapes of the input waveguide and the output waveguide of the second interleaving unit are half-ring-type or half-racetrack-type.

6. The wavelength interleaver of claim 1, wherein the adapting waveguide is a half-ring-type or a half-racetrack-type waveguide.

7. The wavelength interleaver of claim 1, wherein the filter of the first interleaving unit is a ring-type or a racetrack-type filter.

8. The wavelength interleaver of claim 1, wherein the filter of the second interleaving unit is a ring-type or a racetrack-type filter.

* * * * *